United States Patent
Otsubo

(10) Patent No.: US 6,969,005 B2
(45) Date of Patent: Nov. 29, 2005

(54) OPTICAL UNIT FOR OPTICAL SYMBOL READER

(75) Inventor: Yusuke Otsubo, Osaka (JP)

(73) Assignee: Keyence Corporation, Osaka (JP)

( * ) Notice: Subject to any disclaimer, the term of this patent is extended or adjusted under 35 U.S.C. 154(b) by 122 days.

(21) Appl. No.: 10/401,732

(22) Filed: Mar. 31, 2003

(65) Prior Publication Data

US 2004/0026512 A1    Feb. 12, 2004

(30) Foreign Application Priority Data

Apr. 23, 2002   (JP) .................... P.2002-121513

(51) Int. Cl.$^7$ .............................................. G06K 7/10
(52) U.S. Cl. ........................ 235/462.33; 235/462.01; 235/454
(58) Field of Search ................. 235/462.33, 462.36, 235/462.01, 462.34, 454

(56) References Cited

U.S. PATENT DOCUMENTS

| | | | |
|---|---|---|---|
| 4,387,297 A | 6/1983 | Swartz et al. | |
| 5,559,319 A * | 9/1996 | Peng | 235/462.36 |
| 5,945,659 A * | 8/1999 | Dvorkis et al. | 235/462.36 |
| 6,129,282 A * | 10/2000 | Reddersen | 235/462.45 |
| 6,230,976 B1 * | 5/2001 | Sautter et al. | 235/462.36 |
| 6,382,514 B1 * | 5/2002 | Chung | 235/462.38 |
| 6,616,042 B1 * | 9/2003 | Gofman et al. | 235/462.01 |
| 2002/0018274 A1 | 2/2002 | Aizawa et al. | |

FOREIGN PATENT DOCUMENTS

| | | | |
|---|---|---|---|
| EP | 0 653 723 A | 5/1995 |
| EP | 0 945 819 A | 9/1999 |
| EP | 1 039 409 A | 9/2000 |
| JP | 4-186313 A | 7/1992 |
| JP | 6-139386 A | 5/1994 |
| JP | 7-254041 A | 10/1995 |
| JP | 11-326805 A | 11/1999 |
| JP | 3074136 U | 10/2000 |

* cited by examiner

Primary Examiner—Karl D. Frech
(74) Attorney, Agent, or Firm—Smith Patent Office

(57) ABSTRACT

An optical unit for an optical symbol reader comprises an optical scanner for scanning an optical symbol with the laser beam emitted by a light source, by angularly oscillating a reflection face for reflecting the laser beam owing to an electromagnetic force. The optical scanner comprises a loose bearing structure having a shaft and a bearing bore and supporting a rotor having the reflection face to angularly oscillate freely with respect to a base. A certain bearing gap is formed between an outer diameter of the shaft and an inner diameter of the bearing bore. The optical scanner further comprises a coil spring resiliently for urging the rotor in a predetermined direction so that a part of an outer circumferential face of the shaft may be contacted with an inner circumferential face of a bearing bore.

14 Claims, 10 Drawing Sheets

OPTICAL UNIT FOR OPTICAL SYMBOL READER

BACKGROUND OF THE INVENTION

1. Field of the Invention

The present invention relates to an optical unit contained in an optical symbol reader such as a bar code reader, and more particularly to an optical scanner for scanning an optical symbol such as a bar code by deflecting a laser beam repeatedly.

2. Description of the Related Art

One type of the optical symbol reader such as the bar code reader scans an optical symbol such as a bar code with a laser beam. In the optical symbol reader of this type, a laser beam emitted from a light source such as a semiconductor laser is deflected in one-dimensional or two-dimensional direction by an optical scanner repeatedly to scan an optical symbol (hereinafter referred to as a bar code). A reflected light from the bar code passes through a converging lens and is detected by a photo detector such as a photodiode to decode the bar code in accordance with an electric signal output from the photo detector.

The optical scanner using a polygon mirror (also called a rotating polygon mirror) or a mirror (also called a galvanometer mirror) is well-known. In the optical scanner using the mirror, a laser beam emitted from the light source is reflected from the mirror and directed toward the bar code, and the mirror (or its reflection face) is angularly oscillated at regular intervals to scan the bar code with the laser beam. The related-art structure for vibrating (hereinafter referred to as angularly oscillating) the mirror is made as follows.

(1) A leaf spring has one end fixed, and holds a mirror at the other free end. A permanent magnet is fixed on the mirror, and an electromagnetic coil is disposed near the permanent magnet. The electromagnetic coil is excited at regular periods to give a drive force via the permanent magnet to the mirror. The mirror is vibrated (angularly oscillated) due to the drive force from the electromagnetic coil and a restoring force of the leaf spring member. This leaf spring system was described in, for example, JP-A-7-254041 or JP-A-11-326805.

(2) Another structure uses a rotating mechanism with a rotation shaft and a bearing of the rotation shaft. The mirror and the permanent magnet are fixed to a rotating member (oscillating member). A magnetic substance is disposed near the rotating member so as to exert a suction force between the magnetic substance and the permanent magnet. An electromagnetic coil is excited at regular periods to urge the permanent magnet in an opposite direction to the suction force. The mirror is vibrated (angularly oscillated) by a drive force from the electromagnetic coil and the suction force (acting as the restoring force).

The methods for driving the mirror or exciting the electromagnetic coil include a self-excitation and a separate excitation. The self-excitation method as used herein means a synchronous excitation with a resonance frequency determined by a moment of inertia of the rotating member (oscillating member) containing the mirror, and the restoring force. The separate excitation method as used herein means compulsorily giving a drive force with an exciting current at a lower frequency than the resonance frequency. The self-excitation method has the advantage that there is less exciting current and the drive power efficiency is maximized, but the disadvantage that the resonance frequency is determined by the mechanical structure and the degree of freedom is low. The separate excitation method has the disadvantage that more drive power is consumed and the drive power efficiency is low, because the resonance phenomenon is not used, although the drive period (frequency) can be set up at will to some extent.

The above angular oscillation structure (1) for the mirror has the problem that the structure of a leaf spring holding portion is complex, and the leaf spring is easily damaged due to an impact upon dropping or vibration during transportation. To resolve this problem, a stopper mechanism for restricting the movement of the mirror held at the free end of the leaf spring beyond a normal range of angular oscillation may be additionally provided, or an elastic member for absorbing the impact when the mirror makes contact with the stopper may be disposed. Alternatively, the rotation member (oscillating member) containing the mirror and the permanent magnet may be disposed so that the center of gravity may be matched to the center of rotation, with the center of rotation fixed with a certain gap.

However, even if any improvement method is employed, the number of parts is increased or the structure becomes complex, resulting in the increased manufacturing cost. When the separate excitation method is employed, the mechanical strength may be raised to withstand the impact or vibration by designing the elastic modulus for the leaf spring at a high value, but there is the drawback that the drive power efficiency is so low as to consume more drive current, as previously described.

Also, the angular oscillation structure (2) as above described has the advantage that the structure is simple and strong enough to withstand the impact upon dropping or the vibration during transportation, but has the problem of producing a great loss due to a sliding friction between the shaft and the bearing. Furthermore, since there is a great dispersion in the characteristics for the magnetic substance and the permanent magnet for generating a magnetic force (suction force) as the restoring force, with significant variations in the characteristics upon temperature changes, it is difficult to employ the self-excitation method. That is, the separate excitation method with lower drive power efficiency is obliged to employ.

When lubricating oil is applied to reduce the sliding friction between the shaft and the bearing, dispersion in performance is more likely to occur due to the temperature characteristic of the viscosity of the lubricating oil. The suction force exerted between the magnetic substance and the permanent magnet is inversely proportional to the distance between them to the second power, the distance being changed nonlinearly, along with the rotation of permanent magnet (rotation member), depending on the arrangement of the magnetic substance and the permanent magnet. Accordingly, to obtain a smooth and stable angular oscillation of the mirror, a special drive current waveform may be required.

SUMMARY OF THE INVENTION

It is an object of the invention to provide an optical unit for an optical symbol reader having an optical scanner with a relatively simple structure and the balanced manufacturing cost and power efficiency. It is another object of the invention to miniaturize such optical unit.

In order to accomplish the object above, the following means are adopted. According to the present invention, there is provided an optical unit for an optical symbol reader comprising:

a light source emitting a laser beam;

an optical scanner having an oscillating member with a reflection face for reflecting the laser beam emitted from the light source, the optical scanner scanning an optical symbol with the laser beam by angularly oscillating the reflection face owing to an electromagnetic force; and a photo detector detecting a light reflected from the optical symbol to convert a change in the amount of received light corresponding to a pattern of the optical symbol into an electric signal;

wherein the optical scanner comprises a loose bearing structure for supporting the oscillating member to angularly oscillate freely with respect to a fixing member, the loose bearing structure having a shaft and a bearing bore with a gap formed between an outer diameter of the shaft and an inner diameter of the bearing bore, and the optical scanner further comprises a resiliently urging member for resiliently urging the oscillating member in a predetermined direction so that a part of an outer circumferential face of the shaft may be contacted with an inner circumferential face of the bearing bore.

With this constitution, there is the effect that the frictional resistance between the shaft the bearing bore is decreased by the loose bearing structure, and the stable optical scan plane can be obtained by resiliently urging the oscillating member in a predetermined direction with the resiliently urging member. This optical unit has a bearing system, which is not complex unlike the related-art supporting structure using the leaf spring, and can be miniaturized as a whole. It also has a feature of being able to withstand the impact or transportation vibration.

In the above-mentioned optical unit, the bearing gap is preferably in a range of from 5% to 50% of the outer diameter of the shaft, and more preferably about 10%. The bearing gap in a typical rotation mechanism is 1% or less, whereby the loose bearing structure employed for the optical unit of the invention has a considerably large bearing gap.

As a specific example, the bearing bore passes through an almost central portion of the oscillating member, and the shaft is fixed to the fixing member and inserted into the bearing bore of the oscillating member. Alternatively, the shaft is secured to the almost central portion of the oscillating member, and the bearing bore is provide on a bearing portion provided on the fixing side member.

As another specific example, the resiliently urging member takes a relatively simple constitution that is a coil spring (tension spring) stretched between an engagement portion of the oscillating member and an engagement portion of the fixing side member.

In another preferred embodiment, a permanent magnet is provided at one end of the oscillating member, a balancer having a mass almost equivalent to that of the permanent magnet is provided at the other end of the oscillating member, and an electromagnetic coil generating the electromagnetic force with the permanent magnet is provided on the fixing member. Because the balancer is provided, the oscillating member can have its center of gravity located on the central axis of the angular oscillation, so that the angular oscillation of the oscillating member and the scanning of the laser beam are stabilized.

In still another embodiment, the resiliently urging member is a coil spring stretched between an engagement portion of the oscillating member and an engagement portion of the fixing side member, a permanent magnet is provided at one end of the oscillating member, an electromagnetic coil generating the electromagnetic force with the permanent magnet is disposed to sandwich the coil spring with the light source, and the reflection face is provided at the other end of the oscillating member. With this constitution, the oscillating member, the coil spring (resiliently urging member), the light source and the electromagnetic coil can be arranged in a saved space on the substrate, whereby the optical unit can be further miniaturized.

More preferably, the light source, the oscillating member and the electromagnetic coil are arranged on the front surface of the substrate that is the fixing member, and the photodetector and a converging lens for converging a reflected light from the optical symbol into the photo detector are arranged on the back surface of the substrate. That is, the optical unit has a two-stage structure to further reduce the area of the substrate.

DETAILED DESCRIPTION OF THE INVENTION

The preferred embodiments of the present invention will be described below with reference to the accompanying drawings.

Figure 1:
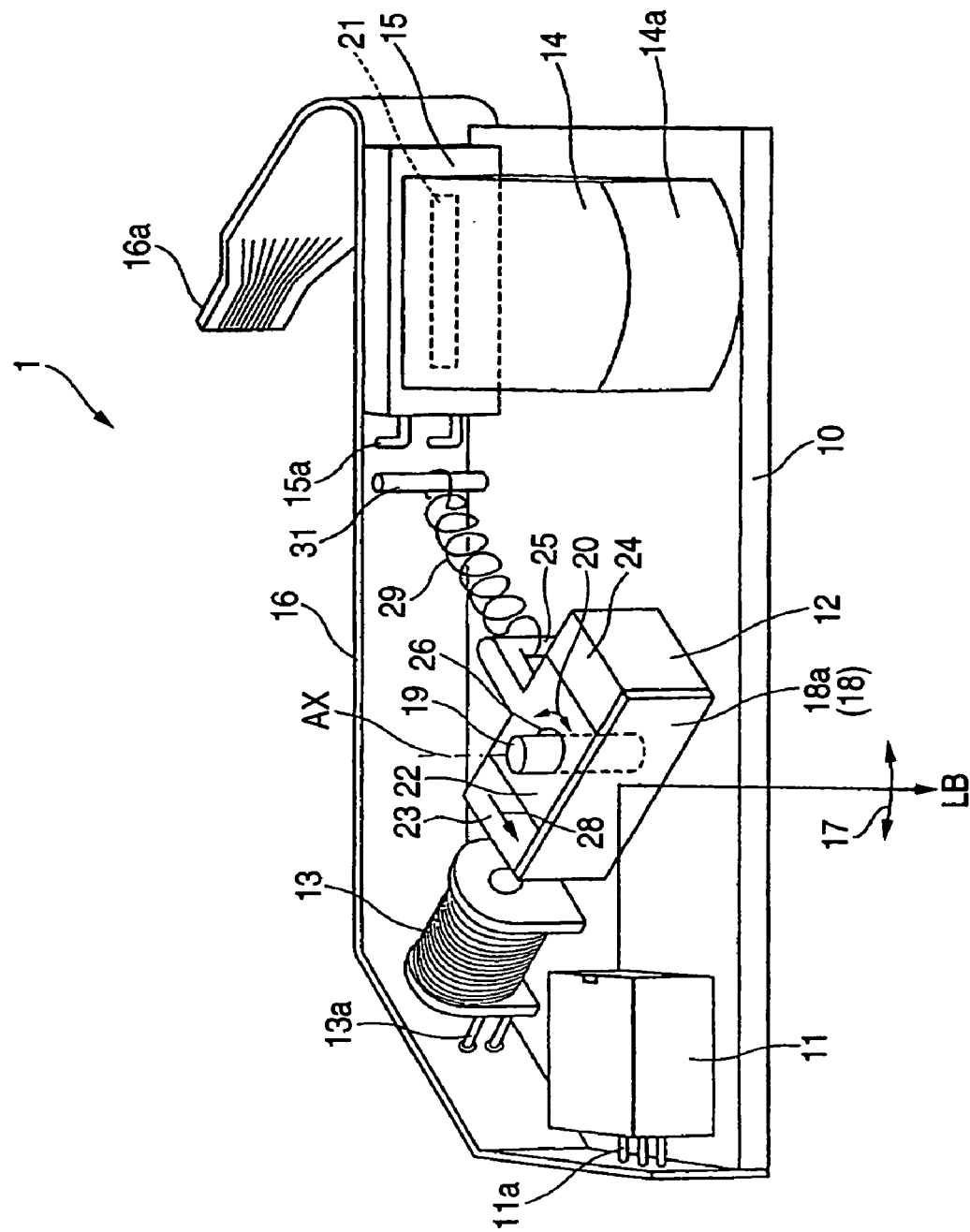
FIG. 1 is an appearance view of an optical unit for an optical symbol reader according to a first embodiment of the present invention.

FIG. 1 is an appearance view of an optical unit for an optical symbol reader according to a first embodiment of the present invention. The optical unit for optical symbol reader (hereinafter simply referred to as optical unit) 1 comprises a light source 11, a rotor 12, an electromagnetic coil 13, a converging lens 14, and a photo detector 15, which are disposed on a base 10.

Wiring means 16 as a flexible substrate is fixed in part around the periphery of the base 10, in which a leader line 11a for the light source 11, a leader line 13a for the electromagnetic coil 13, and a leader line 15a for the photo detector 15 are connected to the wiring means 16. At an end portion 16a of the wiring means 16, an edge connector is formed to connect with an electronic circuit contained in an optical symbol reader (bar code reader). Accordingly, the light source 11, the electromagnetic coil 13 and the photo detector 15 are connected via the wiring means 16 to the electronic circuit. The electronic circuit contains a drive circuit for the light source 11 (semiconductor laser), an excitation circuit (optical scan control circuit) for the electromagnetic coil 13 and an output signal processing circuit for the photo detector 15.

The light source 11 contains a semiconductor laser, a collimator lens and an optical diaphragm. The rotor 12 has a mirror 18 mounted having a reflection face with an angle of about 45 degrees with respect to the light source 11. A laser beam outgoing from the light source 11 is reflected from the mirror 18 of the rotor 12 and bent at almost right angle in the optical path to proceed along an optical path LB as indicated by the broken line in FIG. 1.

The rotor 12 is angularly oscillated (vibrated) around a shaft 19 fixed vertically on an upper face of the base 10, as indicated by the arrow (angular oscillation direction) 20. As a result, the optical path LB of laser beam is deflected (scanned) repeatedly as indicated by the arrow (scan direction) 17, owing to angular oscillation of the reflection face 18a of the mirror 18. An optical symbol composed of code patterns having a different reflectance such as the bar code is scanned by the laser beam, so that its reflected light arrives at an aperture portion 14a of the converging lens 14. Light converged by the converging lens 14 is passed into a light receiving window 21 for the photo detector 15 such as a photodiode. Thus, the intensity of light reflected from the optical symbol is converted into an electric signal by the photo detector 15. The electric signal output from the photo detector 15 is passed via the wiring means 16 to a signal processing circuit to decode the optical symbol (bar code).

Figure 2:
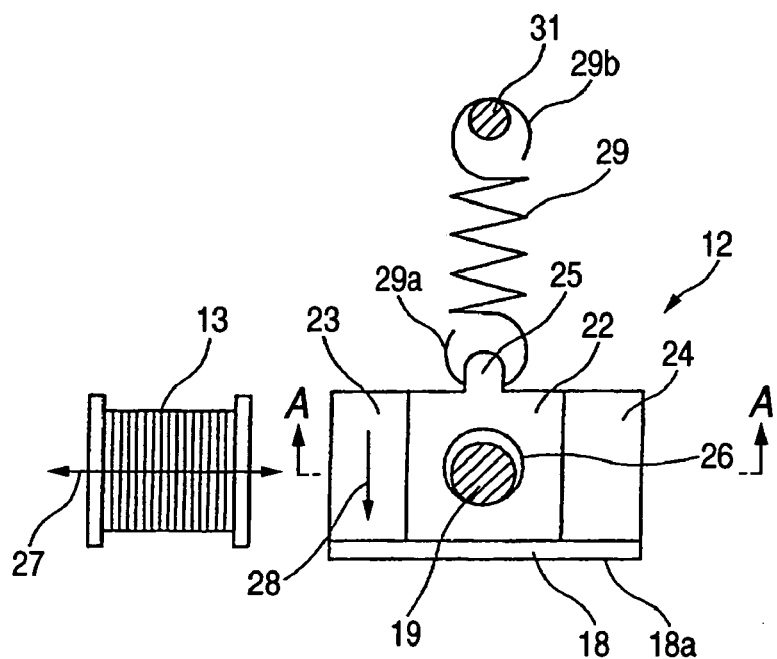
FIG. 2 is a plan view for explaining an angular oscillation structure of a rotor.

FIG. 2 is a plan view for explaining an angular oscillation structure of the rotor 12. The rotor 12 has a bearing member 22, the mirror 18, a permanent magnet 23 and a balancer 24. The bearing member 22 is formed with a vertical bearing bore 26 through which the shaft 19 passes, an inner diameter of the bearing bore 26 is larger by a bearing gap than an outer diameter of the shaft 19. The permanent magnet 23 and the balancer 24 are fixed to sandwich the bearing member 22 from both sides. The permanent magnet 23 has a direction of magnetization 28 (or direction of opposite polarity) that is perpendicular to a direction of magnetic field 27 generated by the electromagnetic coil 13.

The mirror 18 has the reflection face 18a orthogonal to the direction of magnetization 28 for the permanent magnet 23. A hook engaging portion 25 is provided on an opposite face of the bearing member 22 with the bearing bore 26 to the mirror 18, and engaged by a hook 29a at one end of a coil spring 29. A hook 29b at the other end of the coil spring 29 engages a hook engagement pin 31 stood on the base 10. In this manner, the coil spring 29 operates as resiliently urging member (tension spring) for resiliently urging the rotor 12 containing the mirror 18 in a direction perpendicular to the shaft 19. Namely, the rotor 12 is resiliently urged in a direction where the coil spring 29 tends to contract, so that the shaft 19 makes contact with the opposite side of the hook engagement portion 25 (or the mirror 18 side) on the inner face of the bearing bore 26.

The balancer 24 has an equivalent mass of the permanent magnet 23, both being disposed symmetrically with respect to the bearing bore 26. In this way, the rotor 12 has its center of gravity located on a shaft center AX of the shaft 19. The material for the balancer 24 is preferably an iron alloy such as stainless with a specific weight close to that of the permanent magnet, but may be the same material as the permanent magnet or other suitable materials. From the purpose of balancing the center of gravity for the rotor 12 as a whole, the balancer 24 is preferably provided, but is not indispensable. The weight, shape and arrangement of the balancer 24 may be set up at will according to the use purpose.

Figure 3:
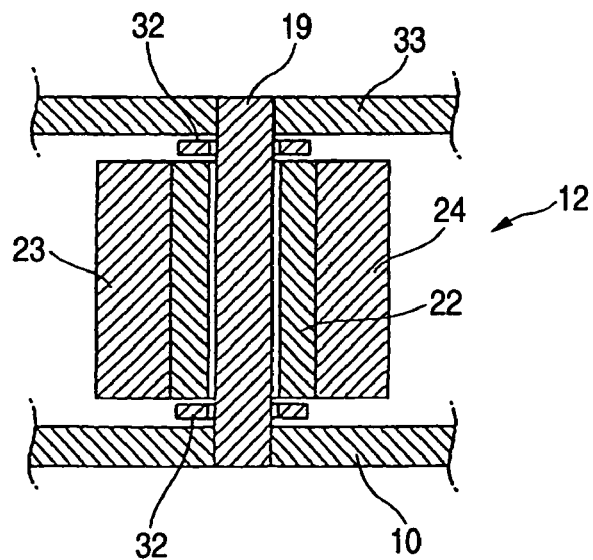
FIG. 3 is a cross-sectional view of the rotor as shown in FIG. 2, taken along the line A—A.

FIG. 3 is a cross-sectional view of the rotor 12 as shown in FIG. 2, taken along the line A—A. A washer 32 is interposed between the base 10 and the rotor 12. Thus, the contact between the rotor 12 and the base 10 is avoided to enable the rotor 12 to be angularly oscillated with a frictional resistance as small as possible. Though omitted in FIG. 1, a lid member 33 for fixing an upper end of the shaft 19 is provided on the opposite side of the base 10 with the rotor 12 interposed. A washer 32 is also provided between the lid member 33 and the rotor 12 for the same purpose as above. The materials for the washer 32 may preferably include stainless steel, Nylon and fluororesin having a highly sliding (low sliding friction) property.

As shown in FIGS. 1 and 2, the electromagnetic coil 13 is installed near the permanent magnet 23, and has the direction of magnetic field 27 orthogonal to the direction of magnetization 28 for the permanent magnet 23. If an appropriate exciting current is flowed through the electromagnetic coil 13, an electromagnetic force is produced between the electromagnetic coil 13 and the permanent magnet 23. Therefore, the rotor 12 is angularly oscillated at a resonance frequency that is determined by the tension (restoring force) of the coil spring 29 and the moment of inertia of the rotor 12. The direction of magnetic field 27 is changed alternately (alternating field) at a predetermined timing by a drive circuit of the self-excitation or separate excitation method as described below.

Figure 4A:
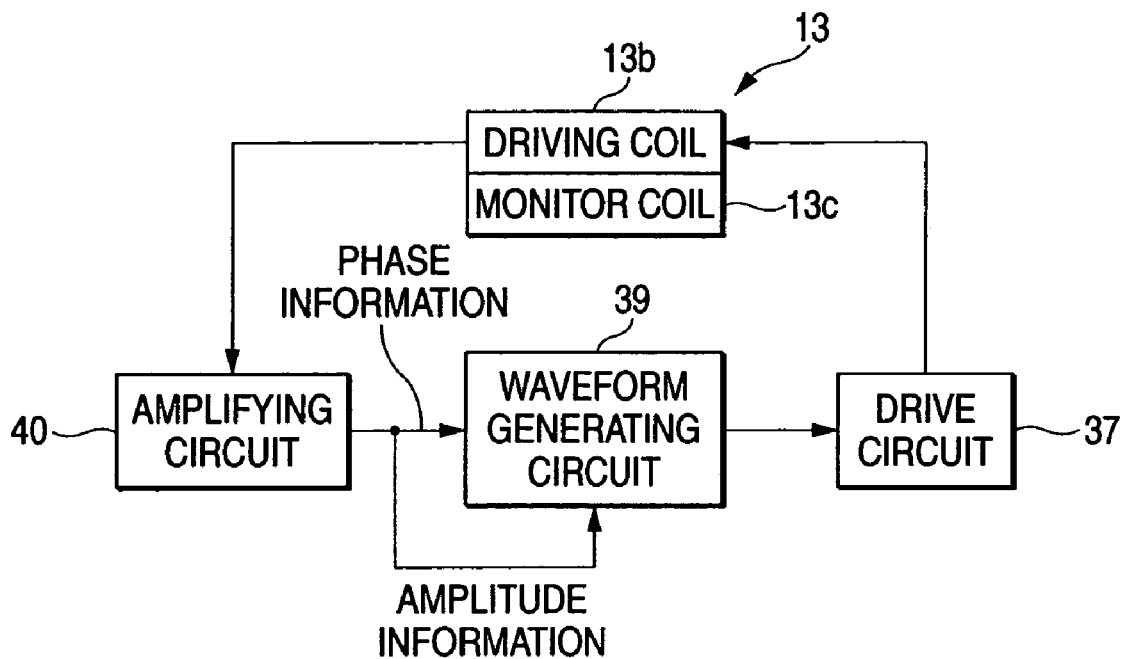
FIGS. 4A and 4B are block diagrams showing drive circuits for an electromagnetic coil.
Figure 4B:
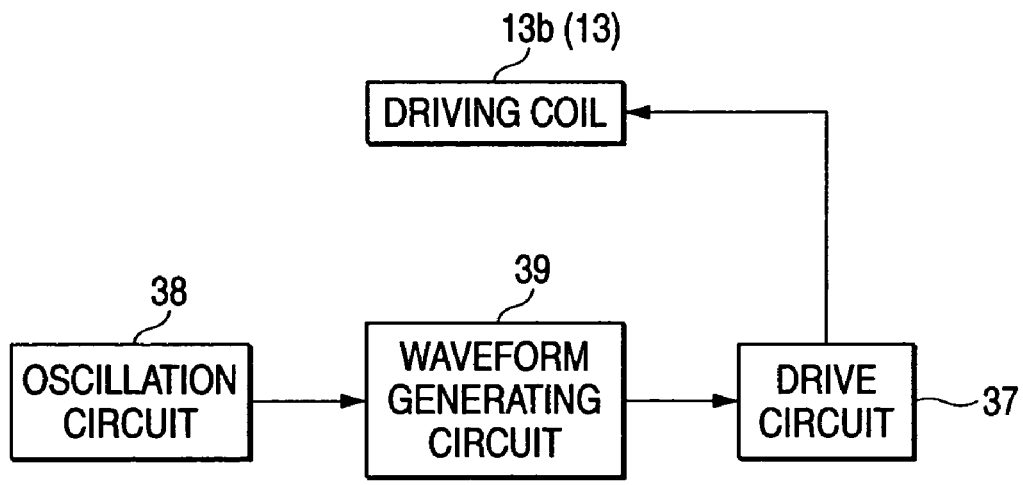

FIGS. 4A and 4B are block diagrams showing drive circuits for the electromagnetic coil 13. In the drive circuit of the self-excitation method as shown in FIG. 4A, the electromagnetic coil 13 is a bifilar winding of a driving coil 13b and a monitor coil 13c. The permanent magnet 23 is moved from the electromagnetic coil 13, along with the angular oscillation of the rotor 12, so that an electric current is induced in the monitor coil 13c. This electric current is amplified by an amplifying circuit 40. A waveform generating circuit 39 generates a drive current waveform in synchronism with the resonance frequency, on the basis of the phase information and amplitude information obtained from the amplifying circuit 40. This drive current waveform is amplified by a drive circuit 37 and supplied to the driving coil 13b. By driving (excitation) with this self-excitation method, the rotor 12 can be angularly oscillated efficiently by a small exciting current.

The electromagnetic coil 13 can be also excited by the drive circuit of the separate excitation method as shown in FIG. 4B. With this method, the electromagnetic coil 13 includes the driving coil 13b alone. An oscillation circuit 38 generates a signal with a predetermined drive frequency lower than the resonance frequency. The waveform generating circuit 39 generates a drive current waveform of the drive frequency. This drive current waveform is amplified by the drive circuit 37, and supplied to the driving coil 13b. With this separate excitation method, since the resonance phenomenon is not used, more exciting current is consumed, with lower drive power efficiency, but there is the merit that the drive frequency can be set up at will to some extent.

As described above using FIGS. 1 and 2, there is a certain bearing gap between the outer diameter of the shaft 19 and the inner diameter of the bearing bore 26 in the optical unit 1 of this embodiment. This bearing gap is set in a range of from 5% to 50% of the outer diameter of the shaft 19, preferably, about 10%. In one example, when the outer diameter of the shaft 19 was 1.00 mm, the inner diameter of the bearing bore 26 was set at 1.10 mm. The depth (through length) of the bearing bore 26 was set at 3.2 mm.

In a typical rotating mechanism, the bearing gap is less than 10% of the outer diameter of the shaft. Sensibly, the bearing gap is set to be as narrow as possible to reduce the rattling of rotation. As an example, in a normal sintered metallic bearing, the inner diameter of the bearing is set to be from 1.005 to 1.010 mm for the shaft having a nominal diameter of 1 mm. The bearing having a shaft diameter of about several tens mm in the vehicle engine has a normal ratio of the bearing gap to the shaft diameter (C/d value) of 0.001.

In contrast, the C/d value of this embodiment is 0.1. It will be found that the bearing gap for the optical unit 1 of this embodiment is set to be significantly larger than the sensible value. In the following description, the rotating mechanism (bearing structure) having a C/d value of 0.01 or greater in this embodiment is referred to as a loose bearing structure.

The optical unit 1 of this embodiment has the advantage that the frictional resistance between the shaft 19 and the bearing bore 26 in accordance with the angular oscillation of the rotor 12 is reduced by employing the loose bearing structure for the angular oscillation structure of the mirror 18 (rotor 12). This is because the loose bearing structure has a smaller sliding friction component between the shaft 19 and the bearing bore 26 during the angular oscillation, as compared with when the bearing gap is small, and has a significant percentage of rolling friction component. In other words, the sliding area between the shaft 19 and the bearing bore 26 is decreased.

However, if the bearing gap is large simply, some movement (deflection) occurs not only in the angularly oscillating direction 20 but also in the torsion direction, when the rotor 12 is angularly oscillated, whereby there is the possibility that the optical scanning (scan direction 17) of the laser beam is unstable. Thus, in the optical unit 1 of this embodiment, a part of the inner face of the bearing bore 26 is pressed resiliently against the shaft 19 with an appropriate urging force, using the coil spring 29. Therefore, the rotor 12 is less likely to move in the torsion direction, so that the laser beam can scan stably in the scan direction 17.

In the optical unit 1 of this embodiment, the urging direction of the rotor 12 by the coil spring 29 and the reflection face 18a of the mirror 18 are orthogonal, whereby even if the rotor 12 is distorted (rotated) axially in the urging direction of the coil spring 29, the reflection face 18a of the mirror 18 is not changed. Accordingly, the scan direction 17 of the laser beam is not affected. This invention is not limited to the above constitution, but another embodiments, which will be explained, the urging direction of the rotor 12 by the coil spring 29 and the reflection face 18a of the mirror 18 are set up at about 45 degrees. In this case, owing to the structure where the part of the inner face of the bearing bore 26 is resiliently pressed against the shaft 19 by the coil spring 29, there is the effect that the rotor 12 is less distorted in the torsion direction.

The material of the bearing member 22 is polyacetal resin in one example. However, the resins or metals having high sliding property (sliding friction) such as polyether-ether-keton resin, polyamide resin, fluororesin, polyester resin, polyphenilenesulfide, and other materials may be used. The resin bearing, an oilless metal bearing, a metal bearing, or another bearing component may be provided at a position corresponding to the bearing bore 26 of the rotor 12.

A lubricant may be applied on a portion where the bearing member 22 and the shaft 19 or washer 32 slide. Because the bearing gap is large, there is less adverse influence such as degradation in temperature characteristic caused by the viscous resistance of the lubricant. If an adequate amount of lubricant is applied, the frictional resistance can be further reduced. The lubricant is most preferably a fluorine-based lubricant containing fluororesin particles, but fluorine oil, mineral oil, lithium grease, fluorine grease, and other lubricants may be used. Alternatively, lubrication coating may be applied.

The cross-sectional shape of the bearing bore 26 and the shaft 19 is preferably a circle, but may be a varied circle. For example, an ellipse, a circular arc in part (sliding portion), or a triangle having the tip portion may be employed. Alternatively, a distorted structure, a structure having a complex surface configuration, or a structure with waviness may be employed. In essence, the rotor 12 having the bearing bore 26 may be angularly oscillated against the shaft 19 within a certain angular range smoothly.

Figure 5A:
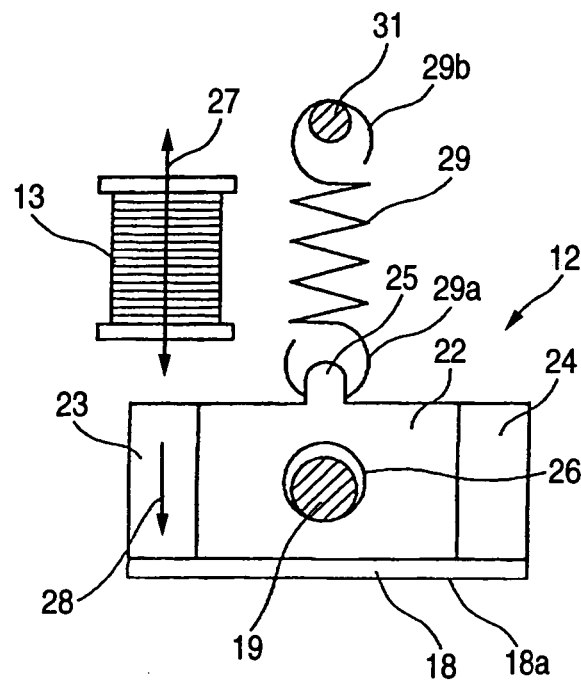
FIGS. 5A and 5B are views showing variation examples of the arrangement of a permanent magnet and the electromagnetic coil.
Figure 5B:
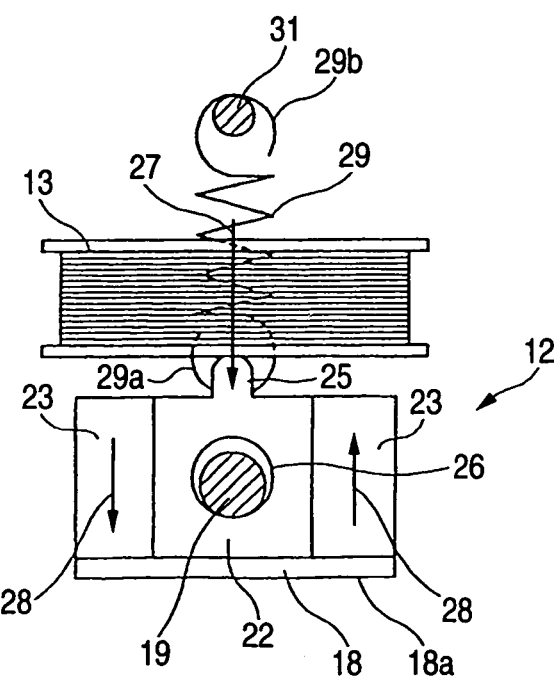

FIGS. 5 and 6 are views showing variation examples regarding the arrangement of the permanent magnet 23 and the electromagnetic coil 13. In a variation example as shown in FIG. 5A, the permanent magnet 23 and the electromagnetic coil 13 are arranged so that the direction of magnetization 28 of the permanent magnet 23 and the direction of magnetic field 27 generated by the electromagnetic coil 13 may be parallel. In a variation example as shown in FIG. 5B, a pair of permanent magnets 23 are arranged on both sides of the bearing member 22 with the bearing bore 26 interposed, their directions of magnetization 28 are parallel to each other, and opposite. A horizontal electromagnetic coil 13 acting on the pair of permanent magnets 23 is disposed, and the direction of magnetic field 27 is parallel to the direction of magnetization 28 of the permanent magnet 23.

Figure 6A:
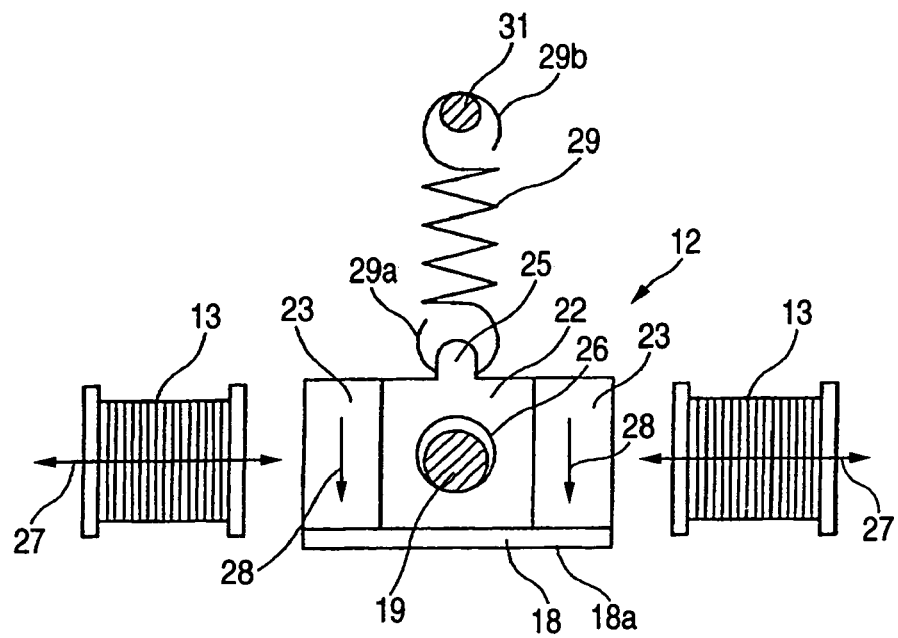
FIGS. 6A and 6B are views showing another variation examples of the arrangement of the permanent magnet and the electromagnetic coil.
Figure 6B:
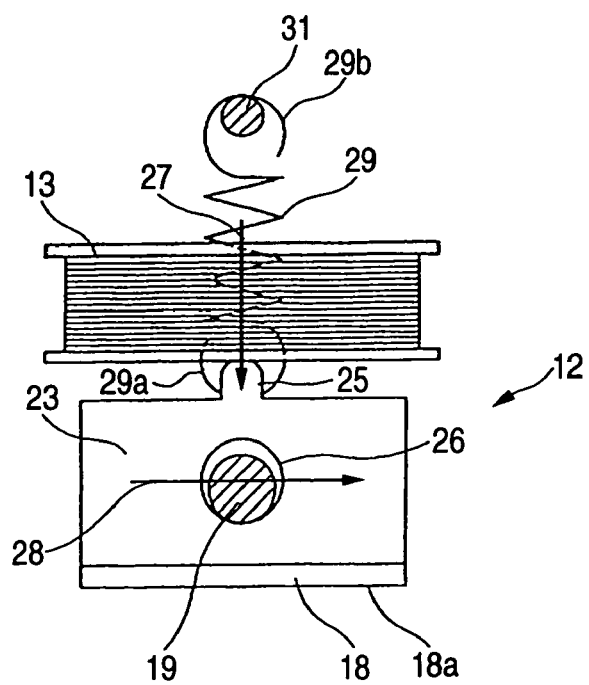

In a variation example as shown in FIG. 6A, a pair of permanent magnets 23 are arranged on both sides of the bearing member 22 with the bearing bore 26 interposed, their directions of magnetization 28 are parallel to each other, and the same (of course, they may be opposite). One pair of electromagnetic coils 13 are provided to individually act on one pair of permanent magnets 23, in which the direction of magnetic field 27 generated by the electromagnetic coils 13 is perpendicular to the direction of magnetization 28 of the permanent magnets 23. Namely, the constitution as shown in FIG. 2 is disposed on both sides with the bearing bore 26 interposed. In a variation example as shown in FIG. 6B, the rotor 12 as a whole consists of the permanent magnet 23, its direction of magnetization 28 being orthogonal to the urging direction of the coil spring 29. The electromagnetic coil 13 having the same constitution of FIG. 5B is provided. Besides the variation examples as shown in FIGS. 5A–5B and 6A–6B, various variations may be made to the arrangement of the permanent magnet 23 and the electromagnetic coil 13.

Figure 7A:
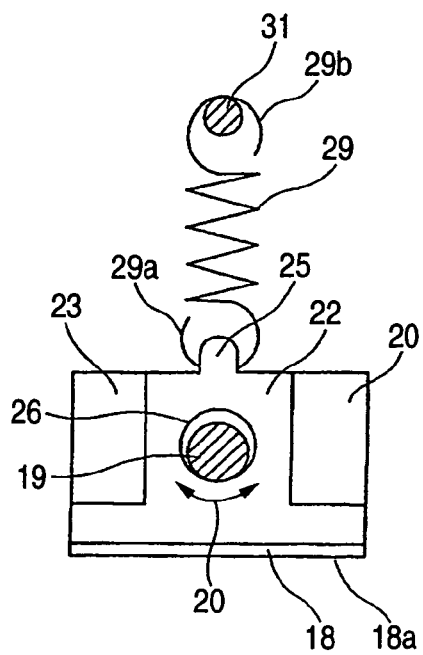
FIGS. 7A–7C are views showing another variation examples in which the mirror has an inclined reflection face.
Figure 7B:
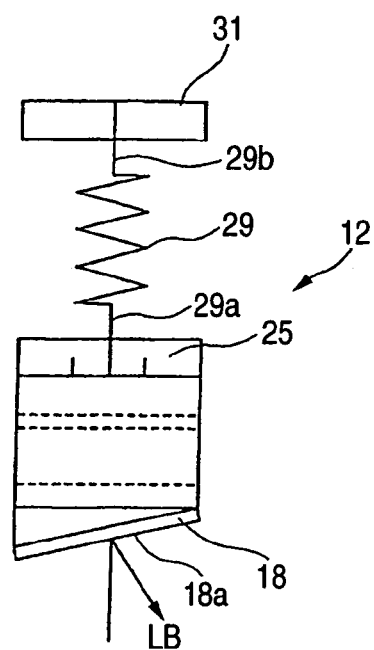
Figure 7C:
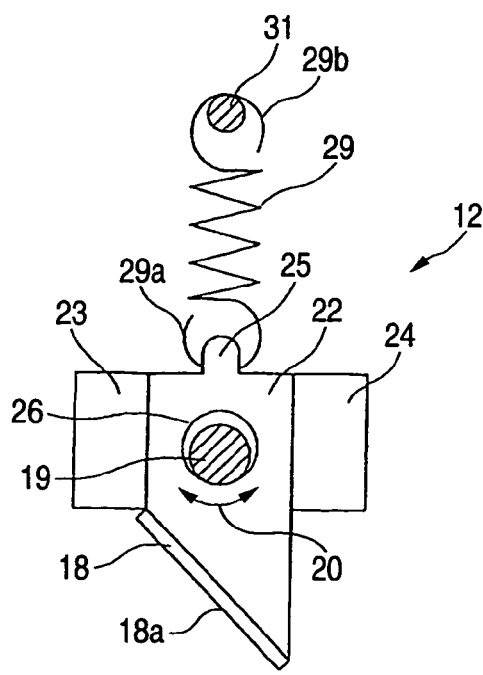

FIGS. 7A–7C are views showing variation examples in which the reflection face 18a of the mirror 18 is disposed at an angle. In this variation example in which FIG. 7A is a plan view and FIG. 7B is a side view, the reflection face 18a of the mirror 18 is slightly angled as seen from the side. As a result, if a laser beam incident in parallel to the angular oscillation face of the rotor 12 is reflected from the reflection face 18a of the mirror 18, its reflected light goes in a direction at an angle from the angular oscillation face, as indicated by the optical path LB. Accordingly, this structure is suitable in the case where the reference plane of the optical unit 1 (plane of the base 10) is angled from the optical scan face.

Also, in a variation example as shown in a plan view of FIG. 7C, the reflection face 18a of the mirror 18 is set not at right angles but at 45 degrees from the urging direction of the rotor 12 by the coil spring 29 in the plan view. It may be set at any other angle than 45 degrees, for example, 30 degrees or 60 degrees. This structure is suitable for the saved space arrangement to make the optical unit 1 compact, as will be described later in second and third embodiments.

Figure 8A:
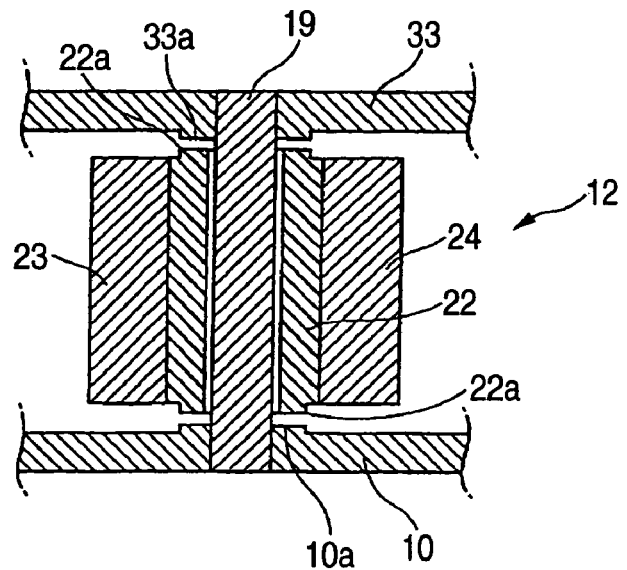
FIGS. 8A and 8B are cross-sectional views showing another variation examples of the angular oscillation structure of the rotor as shown in FIG. 3.
Figure 8B:
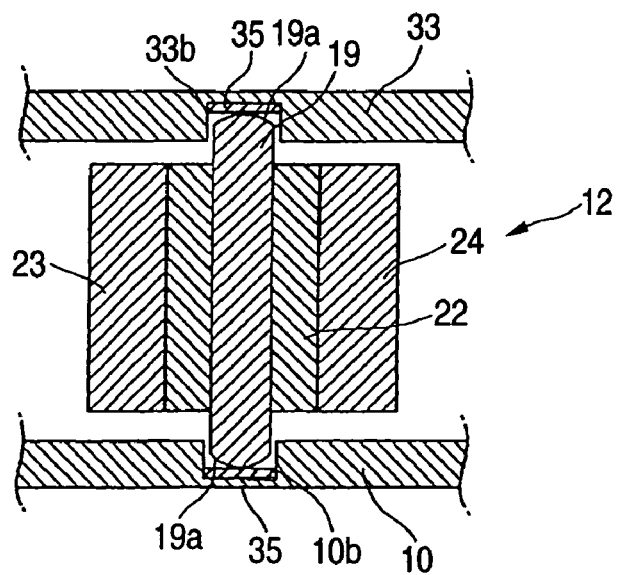

FIGS. 8A and 8B are cross-sectional views showing variation examples of the angular oscillation structure of the rotor 12 as shown in FIG. 3. In the variation example as shown in FIG. 8A, instead of the washer 32 (FIG. 3), a flange 22a is formed in the bearing member 22, and the flanges 10a and 33a are formed in the base 10 and the lid member 33, so that the flange 22a and the flange 10a or 33a are slid with each other. These sliding faces are worked to have a low sliding friction. By eliminating the washer 32, the effect of reducing the number of parts and the number of assembling steps can be obtained.

In another variation example as shown in FIG. 8B, the shaft 19 is secured to the central member (bearing member) 22 of the rotor 12, and the bearing portions (concave portions) 10b and 33b are provided in the base 10 and the lid member 33. The spherical thrust faces 19a are formed at both ends of the shaft 19. Each of the bearing portions 10b and 33b is provided with a disk member 35 made of a material with highly sliding property (low sliding friction) such as stainless steel or fluororesin for accepting the thrust face 19a of the shaft 19. In this angular oscillation structure, the bearing gap is also kept between the outer diameter of the shaft 19 and the inner diameter of the bearing portions 10b and 33b (corresponding to the bearing bore) to form a loose bearing.

Figure 9:
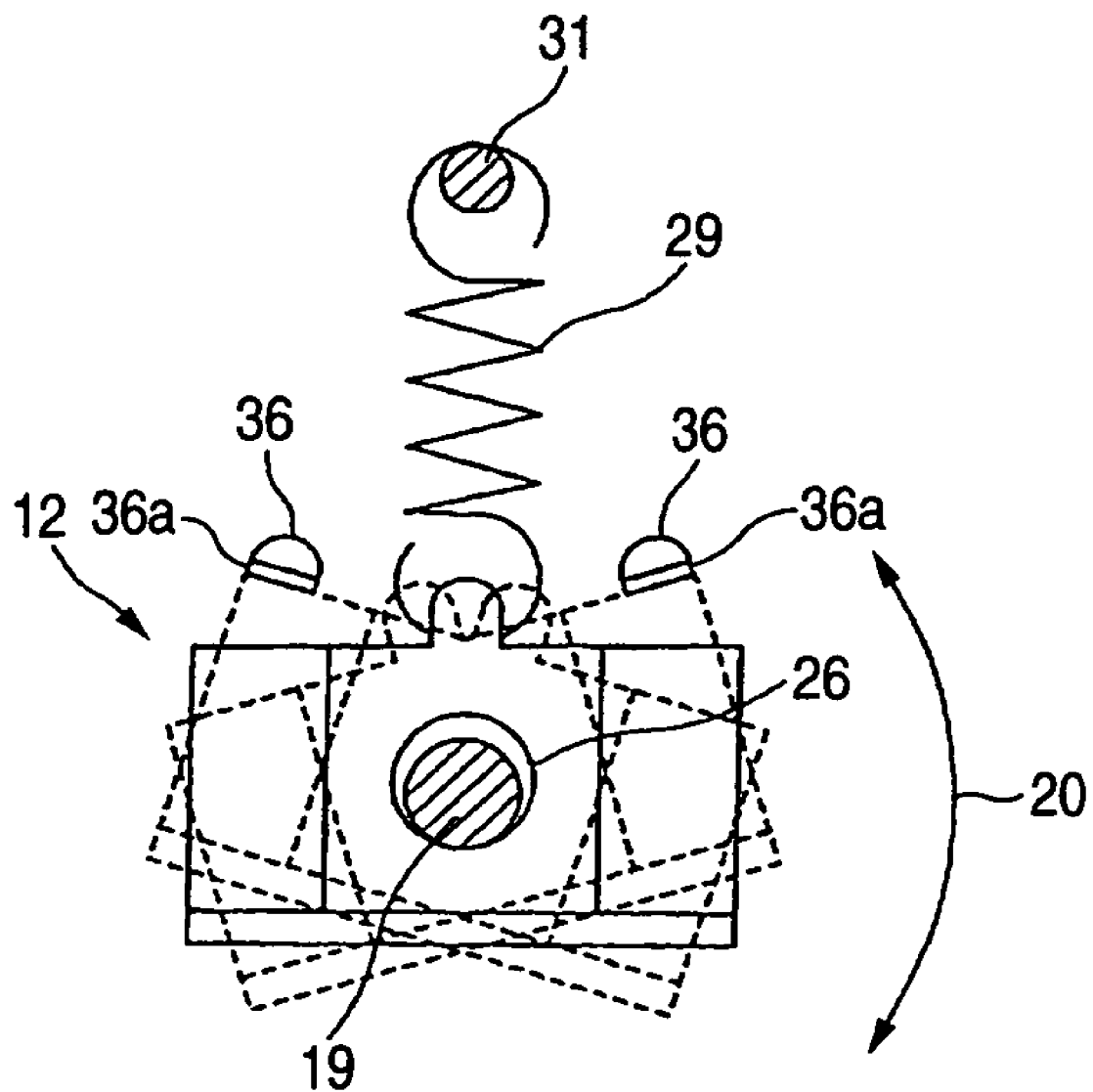
FIG. 9 is a view showing another variation example in which a stopper for restricting an angular oscillation range of the rotor is provided.

FIG. 9 is a view showing a variation example in which a stopper for regulating the angular oscillation range of the rotor 12 is provided. If the rotor 12 is rotated excessively by the impact or vibration, there is the fear that the coil spring 29 is damaged. To avoid this, a pair of stoppers 36 are provided on the base 10 to restrict the excessive rotation of the rotor 12 by making contact with the rotor 12 when it is rotated beyond a predetermined angular oscillation range (rotational angle) in this variation example. Furthermore, an impact absorbing member 36a made of an elastic material such as rubber, sponge or urethane resin is preferably provided on a portion of the stopper 36 making contact with the rotor 12.

Figure 10A:
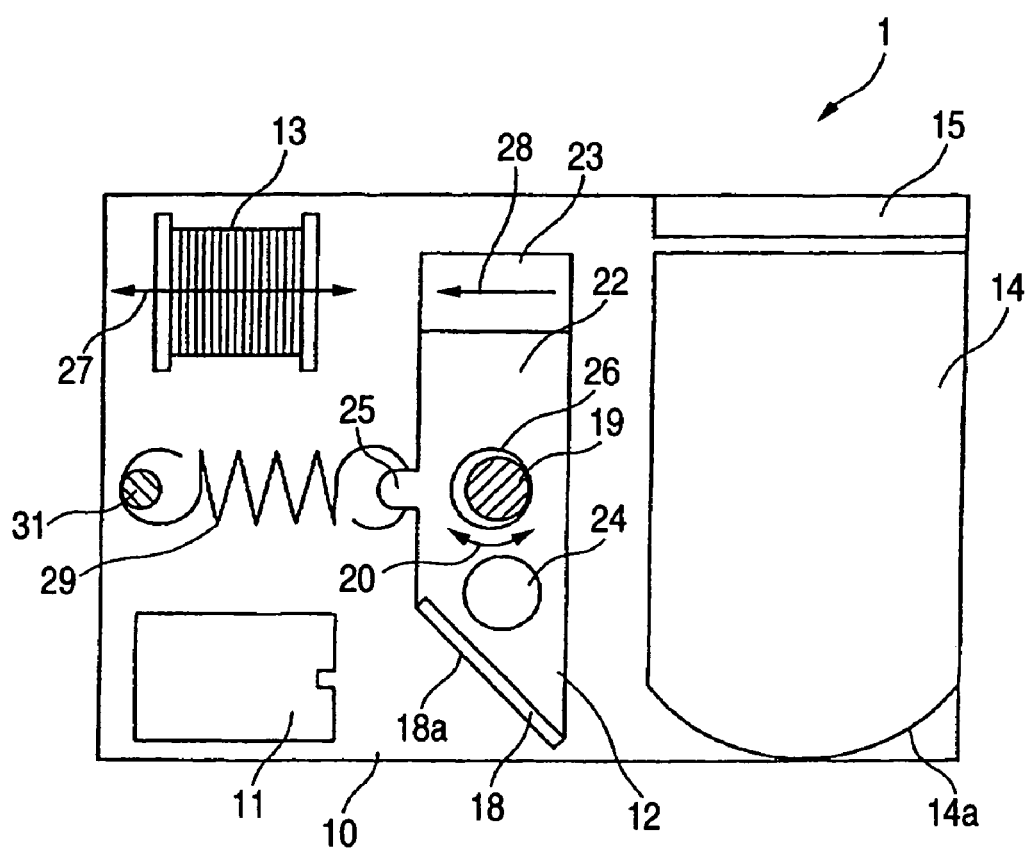
FIG. 10A is a plan view of an optical unit according to a second embodiment of the invention.
Figure 10B:
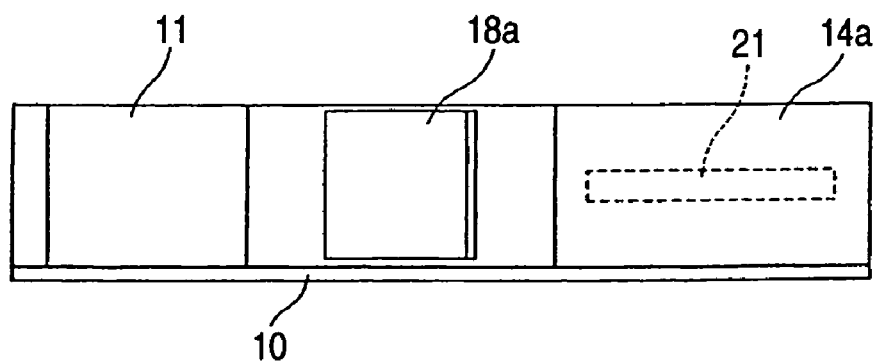
FIG. 10B is a side view of the optical unit of FIG. 10A.

FIGS. 10A and 10B are views showing an optical unit according to a second embodiment of the invention. FIG. 10A is a plan view and FIG. 10B is a side view. In the optical unit 1 of this embodiment, the light source 11, the rotor 12, the electromagnetic coil 13, the converging lens 14 and the photo detector 15 are disposed in a saved space on the base 10. The permanent magnet 23 is fixed at one end of the bearing member 22 having the bearing bore 26 of the rotor 12, and the mirror 18 is fixed at the other end. The electromagnetic coil 13 for generating the magnetic field 27 in parallel and opposite to the direction of magnetization 28 of the permanent magnet 23 is provided facing the magnetic pole of the permanent magnet 23. The reflection face 18a of the mirror 18 forms an angle of about 45 degrees with respect to the urging direction of the coil spring 29.

Namely, the electromagnetic coil 13 and the light source 11 are disposed in a space across the coil spring 29 for resiliently urging the rotor 12, wherein the permanent magnet 23 for generating an electromagnetic force with the electromagnetic coil 13 is fixed at one end of the rotor 12, and the mirror 18 for reflecting a laser beam from the light source 11 and bending its optical path almost at right angles is provided at the other end. With this arrangement, the total size of the optical unit 1 can be reduced. The balancer 24 for the previously described purpose is embedded into the side of the mirror 18 for the bearing member 22.

Figure 11A:
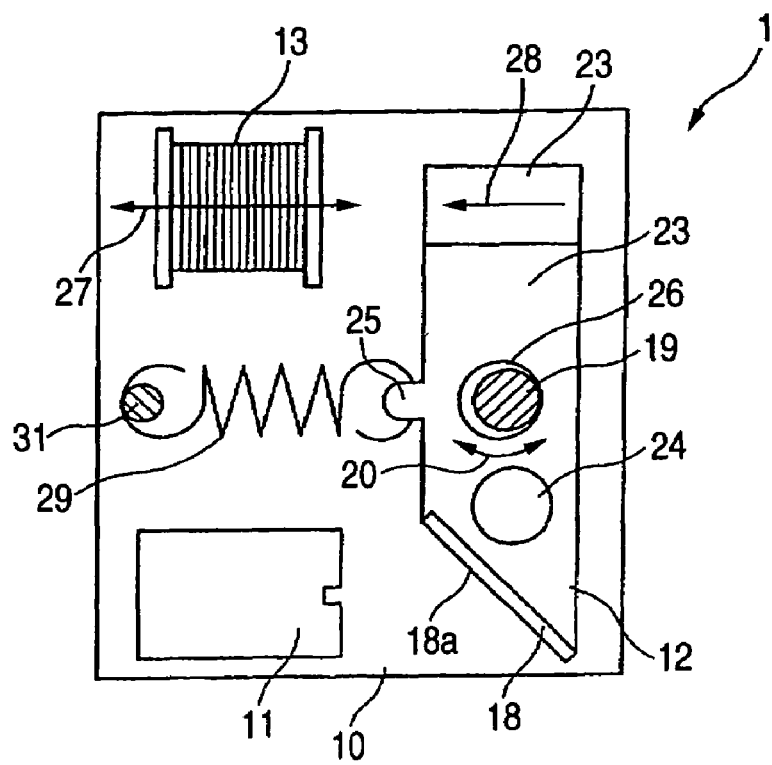
FIG. 11A is a plan view of an optical unit according to a third embodiment of the invention.
Figure 11B:
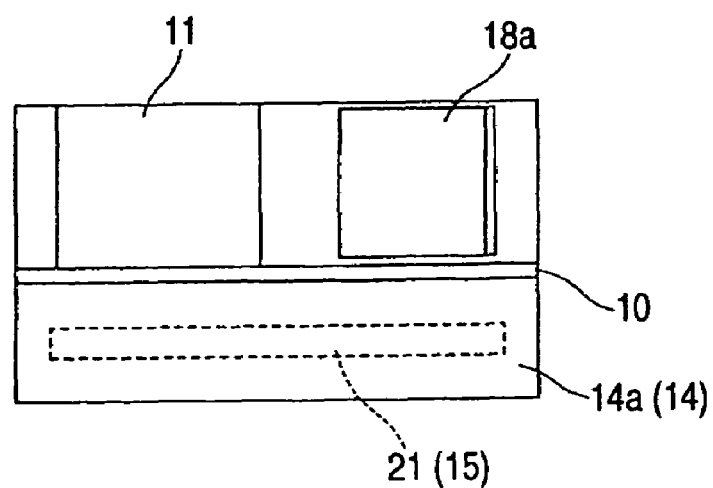
FIG. 11B is a side view of the optical unit of FIG. 11A.

FIGS. 11A and 11B are views showing an optical unit according to a third embodiment of the invention, in which FIG. 11A is a plan view and FIG. 11B is a side view. The optical unit 1 of this embodiment has a smaller area of the base 10 by taking a two-stage structure for the optical unit 1 of the embodiment of FIGS. 10A and 10B. That is, the light source 11, the rotor 12, and the electromagnetic coil 13 are arranged in a saved space on the front side of the base 10, and the converging lens 14 and the photo detector 15 are arranged on the back side of the base 10.

Various embodiments of the present invention have been described above together with the variation examples, but the invention may be embodied by combining these embodiments and variation examples. The invention may be embodied in various forms other than these embodiments and variation examples.

For example, the optical unit of each embodiment employs a non-coaxial light receiving system in which the optical systems for the optical scan portion and the light receiving portion are fully separated. However, this invention is also applicable to a coaxial light receiving system in which the optical systems for the optical scan portion and the light receiving portion are partially shared. As one example of the optical unit of the coaxial light receiving system, the optical scanner scans an optical symbol by a laser beam passing through a bore in the center of a converging mirror such as a concave mirror, in which the reflected light from the optical symbol gets back on the optical scan path to the converging mirror, and the light reflected from the converging mirror is converged into a light receiving window of the photo detector.

As described above, the optical unit for optical symbol reader according to this invention employs the loose bearing for the angular oscillation structure of the optical scanner, whereby there is the effect that the frictional resistance is decreased, and a stable optical scan plane can be obtained by resiliently urging the oscillating member in a predetermined direction with the resiliently urging member. This optical unit is a bearing system, which is not complex unlike the related-art supporting structure using the leaf spring, and can be miniaturized as a whole. It also has a feature of being able to withstand the impact or transportation vibration. Because it is suitable for the driving (excitation) by the self-excitation method, the exciting current can be decreased.

In this manner, this invention can realize the optical unit for optical symbol reader having the optical scanner with a relatively simple structure in which the manufacturing cost and the power efficiency balanced. With a reasonable arrangement of components, the optical unit can be miniaturized as a whole.

What is claimed is:

1. An optical unit for an optical symbol reader comprising:
    a light source emitting a laser beam;
    an optical scanner having an oscillating member with a reflection face for reflecting the laser beam emitted from the light source, the optical scanner scanning an optical symbol with the laser beam by angularly oscillating the reflection face owing to an electromagnetic force; and
    a photo detector detecting a light reflected from the optical symbol to convert a change in the amount of received light corresponding to a pattern of the optical symbol into an electric signal;

wherein the optical scanner comprises a loose bearing structure for supporting the oscillating member to angularly oscillate freely with respect to a fixing member, the loose bearing structure having a shaft and a bearing bore with a gap formed between an outer diameter of the shaft and an inner diameter of the bearing bore, and the optical scanner further comprises a resiliently urging member for resiliently urging the oscillating member in a predetermined direction so that a part of an outer circumferential face of the shaft may be contacted with an inner circumferential face of the bearing bore and wherein between the shaft and the bearing bore during angular oscillation, a percentage of a rolling friction component is larger than a sliding friction component.

2. The optical unit for the optical symbol reader according to claim 1, wherein the gap is in a range of from 5% to 50% of the outer diameter of the shaft.

3. The optical unit for the optical symbol reader according to claim 1, wherein the bearing bore passes through an almost central portion of the oscillating member, and the shaft is fixed to the fixing member and inserted into the bearing bore of the oscillating member.

4. The optical unit for the optical symbol reader according to claim 3, wherein the optical scanner has a washer interposed between the fixing member and the oscillating member.

5. The optical unit for the optical symbol reader according to claim 3, wherein the oscillating member has a flange provided at a surface opposite to the fixing member, and the fixing member has a flange provided at a surface opposite to the flange of the oscillating member so that the flange of the oscillating member and the flange of the fixing member are slid with each other.

6. The optical unit for the optical symbol reader according to claim 1, wherein the shaft is secured to an almost central portion of the oscillating member, and the bearing bore is provided in a bearing portion.

7. The optical unit for the optical symbol reader according to claim 6, wherein the shaft has a spherical thrust face formed at one end, and the bearing portion has a disk member made of a material with highly sliding property for accepting the thrust face of the shaft.

8. The optical unit for the optical symbol reader according to claim 1, wherein the resiliently urging member is a coil spring which is stretched between an engagement portion of the oscillating member and an engagement portion of the fixing member.

9. The optical unit for the optical symbol reader according to claim 8, wherein the optical scanner further comprises a permanent magnet provided at one end of the oscillating member and an electromagnetic coil generating the electromagnetic force with the permanent magnet and being disposed to sandwich the coil spring with the light source, and wherein the reflection face is provided at the other end of the oscillating member.

10. The optical unit for the optical symbol reader according to claim 9, wherein the fixing member is a substrate having a front surface on which the light source, the oscillating member and the electromagnetic coil are arranged and a back surface opposite to the front surface on which the photo detector and a converging lens for converging a reflected light from the optical symbol into the photo detector are arranged.

11. The optical unit for the optical symbol reader according to claim 1, wherein the optical scanner further comprises a permanent magnet provided at one end of the oscillating member, a balancer having a mass almost equivalent to that of the permanent magnet and being provided at the other end of the oscillating member, and an electromagnetic coil generating the electromagnetic force with the permanent magnet and being provided on the fixing member.

12. The optical unit for the optical symbol reader according to claim 1, wherein the fixing member is a substrate having a front surface on which the light source, the oscillating member and an electromagnetic coil for generating the electromagnetic force are arranged and a back surface opposite to the front surface on which the photo detector and a converging lens for converging a reflected light from the optical symbol into the photo detector are arranged.

13. The optical unit for the optical symbol reader according to claim 1, wherein the fixing member has a stopper for regulating an angular oscillation range of the oscillating member.

14. An optical unit for the optical symbol reader comprising:

a light source emitting a laser beam;

an optical scanner having an oscillating member with a reflection face for reflecting the laser beam emitted from the light source, the optical scanner scanning an optical symbol with the laser beam by angularly oscillating the reflection face owing to an electromagnetic force; and a photo detector detecting a light reflected from the optical symbol to convert a change in the amount of received light corresponding to a pattern of the optical symbol into an electric signal;

wherein the optical scanner comprises a loose bearing structure for supporting the oscillating member to angularly oscillate freely with respect to a fixing member, the loose bearing structure having a shaft and a bearing bore with a gap formed between an outer diameter of the shaft and an inner diameter of the bearing bore, and the optical scanner further comprises a resiliently urging member for resiliently urging the oscillating member in a predetermined direction so that a part of an outer circumferential face of the shaft may be contacted with an inner circumferential face of the bearing bore, and wherein the fixing member has a absorbing member which is made of an elastic material and provided on a portion of a stopper making contact with the oscillating member.

* * * * *